United States Patent [19]
Seener et al.

[11] Patent Number: 6,125,642
[45] Date of Patent: Oct. 3, 2000

[54] OIL LEVEL CONTROL SYSTEM

[75] Inventors: G. Thomas Seener, Washington; Joseph H. Heffner, Chesterfield; Roger D. Chamberlain, St. Louis; David C. Macke, Sr., St. Louis; Richard A. Livingston, St. Louis, all of Mo.

[73] Assignee: Sporlan Valve Company, Washington, Mo.

[21] Appl. No.: 09/352,602

[22] Filed: Jul. 13, 1999

[51] Int. Cl.[7] .............................. F25B 31/02; F01M 11/06
[52] U.S. Cl. .......................... 62/193; 62/129; 184/103.1; 417/228; 417/13
[58] Field of Search ............................. 62/192, 193, 126, 62/129, 468, 469; 417/228, 13; 184/6.4, 103.1, 103.2, 108; 73/290 R, 304 R, 304 C

[56] References Cited

U.S. PATENT DOCUMENTS

| | | |
|---|---|---|
| 518,527 | 4/1894 | Kolliker . |
| 1,992,900 | 2/1935 | McIntosh ................................. 62/126 |
| 2,517,464 | 8/1950 | Corcoran ............................... 123/142.5 |
| 2,671,529 | 3/1954 | Hungerford ............................. 184/103 |
| 2,792,912 | 5/1957 | Kangas ................................... 184/103 |
| 4,428,208 | 1/1984 | Krause ...................................... 62/192 |
| 4,490,988 | 1/1985 | Vogel et al. ........................... 62/193 X |
| 5,103,648 | 4/1992 | Barbier ...................................... 62/126 |
| 5,273,134 | 12/1993 | Hegemier et al. ....................... 184/6.4 |
| 5,327,997 | 7/1994 | Nash, Jr. et al. ................. 73/304 R X |
| 5,369,395 | 11/1994 | Waller .................................... 340/603 |
| 5,542,499 | 8/1996 | Westermeyer ........................ 184/103.2 |
| 5,765,994 | 6/1998 | Barbier ................................. 62/193 X |
| 5,832,772 | 11/1998 | McEwan .................................. 73/290 |

FOREIGN PATENT DOCUMENTS

| | | |
|---|---|---|
| 26663/95 | 11/1996 | Australia . |
| 0 638 708 A1 | 2/1995 | European Pat. Off. . |
| 742365 | 3/1933 | France . |
| 2-208198 | 8/1990 | Japan . |
| 5-280322 | 10/1993 | Japan . |
| 467429 | 6/1937 | United Kingdom . |
| 2042087 | 9/1980 | United Kingdom . |
| 2 113 809 | 8/1983 | United Kingdom . |
| WO95/35462 | 12/1995 | WIPO . |

OTHER PUBLICATIONS

Sporlan Valve Company Bulletin 110–10, Oil Level Control System, Sep. 1991, Washington, Missouri.
Sporlan Valve Company Bulletin 110–20, Electronic Oil Level Control System, Jun. 1997, Washington, Missouri.

*Primary Examiner*—Harry B. Tanner
*Attorney, Agent, or Firm*—Cohn, Powell & Hind

[57] ABSTRACT

This oil level control device is for a refrigeration system, the control device being attached between the compressor and the oil supply. The control device includes a housing having an inlet communicating with the oil supply and an outlet communicating with a compressor sump; and a solenoid valve controlling flow from the oil supply into the compressor sump. A sensing chamber having a fixed probe providing a proximity detection system detects the oil level in the sump and responds to a change in the complex permittivity of the oil as the oil level rises and falls to generate a signal that controls the supply of oil to maintain the oil level in the compressor. Circuitry is provided having an input connected to the output of the sensor and an output connected to the solenoid valve.

14 Claims, 8 Drawing Sheets

OIL LEVEL CONTROL SYSTEM

BACKGROUND OF THE INVENTION

This invention relates generally to an oil level control system and particularly to an oil level control for multi-compressors used in a parallel refrigeration system with compressors that do not have oil pumps.

Historically, oil level control systems have been used with refrigeration compressors provided with internal oil pumps. These pumps receive their power from the compressor crankshaft and have an external pressure tap which is used to determine the oil pressure in the compressor. If the pressure is low, a pressure sensitive switch cuts off power to the compressor before damage can occur.

A recent development in the refrigeration industry for multi-compressor racks is the introduction of hermetic compressors using scroll technology. Scroll compressors do not use oil pumps with external taps for lubrication and therefore pressure sensitive switches do not protect the compressor from low oil lubrication damage. This invention provides that protection.

In a multi-compressor parallel refrigeration system, oil levels must be maintained in each compressor regardless of the oil circulation rate of each individual compressor. An oil control system is necessary to control low oil level conditions. In general, the primary components are an oil separator, an oil reservoir and an oil level sensor. Other secondary components may be optionally used.

These system components have been known for many years and are illustrated in Bulletins 110-10 and 110-20 of Sporlan Valve Company of Washington, Mo. These oil control systems respond to a low oil condition and will maintain the compressor oil level at a predetermined level.

Sporlan Valve Company Bulletin 110-10 discloses the use of an oil sensor that is a sealed steel ball providing a float. As the level of the oil rises and falls, the float to which a needle valve is attached rises and falls so that the valve opens and closes to maintain the correct oil level. Bulletin 110-20 also discloses the use of a float, in this case a pivotally mounted, machined float to which a magnet is attached. A hall-effect sensor is used to detect the position of a magnet on the float and therefore the oil level. As the level of oil changes, the angle of pivot changes and a signal is generated by the hall-effect sensor which opens and closes a solenoid valve to maintain the correct oil level. This system is described in patent application Ser. No. PCT/AU95/00354 (WO 95/35462) published Dec. 28, 1995. The disadvantage of this system is that ferrous particles tend to collect on the magnetized float, restricting the motion of the float.

Other developments in sensors are referred to generally as proximity detectors. One type of proximity detector is a conventional capacitive sensor. Capacitive sensors are useful for detecting certain materials based on their capacitance but they are generally unable to detect materials based on other properties such as resistance or inductance. Another type of proximity detector is an ultrasonic proximity detector which exploits reflections of sound waves off an object to detect the presence of the object. Ultrasonic detectors are generally unsuitable to detect material very close to the sensor. Still another type of proximity detector is an electromagnetic (EM) wave-based system. These detectors are similar to sonic detectors but use electromagnetic waves and suffer from the same deficiencies. Another type of proximity detector utilizes a tuned sensor element in which a monopole or dipole element is coupled to circuitry designed to be sensitive to the merit factor Q of the tuned circuit. Such sensors are typically tuned to detect high permittivity or high conductivity materials. U.S. Pat. No. 5,832,772 discloses a proximity detector of the latter type, and is incorporated herein by reference.

U.S. patent application Ser. No. 09/338,366 Macke, Sr. et al. filed Jun. 23, 1999 entitled Proximity Detector for Hard-to-Detect Material owned by BECS Technology, Inc. of St. Louis, Mo., discloses another type of proximity detector using a capacitative element in conjunction with particular circuitry for detecting the presence of a wide range of materials. This application is also incorporated herein by reference.

The present invention represents an improvement in these oil level systems in a manner not disclosed in the known prior art.

SUMMARY OF THE INVENTION

This invention provides an improvement over prior oil level control systems and uses a proximity sensor for detecting and maintaining the compressor oil level in a refrigeration system. With this invention, as the oil level rises and falls, the sensor responds to a change in the dielectric coefficient of the media and generates a signal that opens and closes a solenoid valve to maintain the correct oil level.

The present invention provides a means of continuously and reliably monitoring the levels of non-pressurized lubricating fluids in rotating machinery, for example, high capacity compressors used in commercial refrigeration equipment. Since the consequences of compressor failure can be serious in the matter of food stuff contamination and destruction, maintenance of correct compressor lubrication is an important consideration in refrigeration systems reliability.

An advantage of the sensor used herein is that it does not rely on moving parts. In addition, it does not collect ferrous particles because it does not use a magnetic element.

In particular, the proximity sensor used herein may be used for the detection of changes in the permittivity of lubricants used in the lubrication of compressors.

The oil level control is a self-contained unit and attaches directly to the compressor at the location of the threaded sight glass provided by the manufacturer. There are no remote control circuits necessary to operate the unit.

The control unit is provided with a relay to interrupt the compressor electrical control circuit in the event that a low oil condition occurs for an extended period of time. The delays are used with all changes in condition that affect the signal to open and close the solenoid, including an alarm signal. These time delays prevent any short cycling of the control, and are included in the operating parameters.

Essentially, this invention provides an insulated metallic probe located in a conductive sensing chamber. The probe and chamber function as an electrical capacitor. The probe is electrically connected to an RF oscillator and alters the frequency and amplitude of the output of the RF oscillator depending on the quantity of lubricating fluid present in the chamber. The output of the RF oscillator is sampled at a frequency of typically 40 Hz, and the sampled output is detected and applied to a comparator and response sensitivity adjusting circuitry. Further circuitry is employed to activate or deactivate the oil supply depending on the level of fluid detected in the sensing chamber.

A circuit is provided which protects the compressors by disconnecting AC power in the event that demand for oil replenishment is not fulfilled within a predetermined period.

This oil level control device is for each compressor of a multiple compressor refrigeration system, which includes an oil supply, each control device is adapted to be attached between an associated compressor sump and the oil supply. The control device comprises a housing, including an inlet communicating with the oil supply and an outlet communicating with an associated compressor sump; flow control means controlling flow from the oil supply into said compressor sump; a proximity detection system including a sensing chamber and a fixed, insulated metallic probe for detecting the presence of oil in the chamber and generating a signal that controls the supply of oil to said compressor sump to maintain the correct oil level in the sump; and control circuit means connected to the probe, said control circuit means having an output operating the flow control means.

It is an aspect of this invention to provide that the flow control means includes a solenoid valve attached to the housing for controlling flow between the housing inlet and the housing outlet.

It is another aspect of this invention to provide that the oil supply means includes an oil reservoir supplying oil to the compressor sump.

It is still another aspect of this invention to provide that the sensing chamber communicates with the sump for receiving oil from the sump; and the flow control means includes conduit means between the housing inlet and outlet, by-passing said sensing chamber said flow control means including a solenoid valve controlling flow through the conduit means and into the sump.

It is yet another aspect of this invention to provide that the sensing chamber includes lower and upper openings communicating between said chamber and the sump, the lower opening receiving fluid from the sump and the upper opening providing a relief opening permitting oil to rise in the chamber.

The capacitative sensor consists of a short insulated metallic rod disposed in a machined cavity within an aluminum block. The sensor operates on the principle that it is part of the total resonant circuit of an RF oscillator, such as a Colpitts oscillator. Presence of oil in the sensing cavity causes changes in the dielectric coefficient of the medium surrounding the capacitor electrodes and, in particular, changes the complex permittivity of the medium as the oil level rises and falls in the cavity. Changes in the complex permittivity in turn influence the merit factor Q or resonance efficiency in the oscillator tuned circuit. When the oil level is high, the merit factor Q falls, and therefore the oscillator amplitude is diminished. Conversely, at low oil level, the damping factor is reduced and the oscillator amplitude increases. In the present invention, the signal rectification at the Colpitts oscillator transistor base-emitter junction is advantageously used to produce a DC voltage level proportional to the amplitude of the oscillator output.

It is an aspect of this invention to provide that the proximity detection system comprises oscillator means for producing an output signal, the oscillator means comprising a transistor having a base, an emitter and a collector, the transistor having an open and a closed loop gain and a base-emitter junction that rectifies resonant signals at the collector to produce the output signal, the oscillator means further comprising negative feedback means for reducing the sensitivity of the closed loop gain to variations in the transistor's open loop gain and for stabilizing the frequency of the oscillator means; the probe being operatively coupled to the oscillator means for varying the level of the oscillator output signal in response to electrical properties of the oil; and the control circuit means being operatively coupled to the oscillator means to receive the oscillator output signal and being responsive to variations of predetermined magnitudes of the amplitudes of the oscillator output signal for detecting the presence or level of the oil.

It is another aspect of this invention to provide that the negative feedback means comprises a resistive element operatively coupled to the emitter for reducing the sensitivity of the closed loop gain to variations in the transistor's open loop gain and to provide that the negative feedback means further comprises a capacitive element operatively coupling the resistive element to the collector for stabilizing the frequency of the oscillator means.

It is still another aspect of this invention to provide that the probe in conjunction with the oscillator has a merit factor Q, the merit factor Q decreasing as the probe is placed in proximity to the oil and wherein the amplitude of the oscillations of the oscillator means will correspondingly diminish as the merit factor Q decreases, and wherein the oscillator output signal indicates the amplitude of the diminished oscillations.

It is yet another aspect of this invention to provide that the control circuit means generates a plurality of predetermined control signals in response to the detection of the presence or level of the oil and to provide that the control circuit means further comprises comparator means for combining a reference signal and the oscillator output signal to form a difference signal which is representative of the difference between the reference signal and the oscillator output signal.

This oil level control is relatively simple to manufacture and use and is particularly efficient for its intended purpose.

DESCRIPTION OF THE PREFERRED EMBODIMENT

Figure 1:
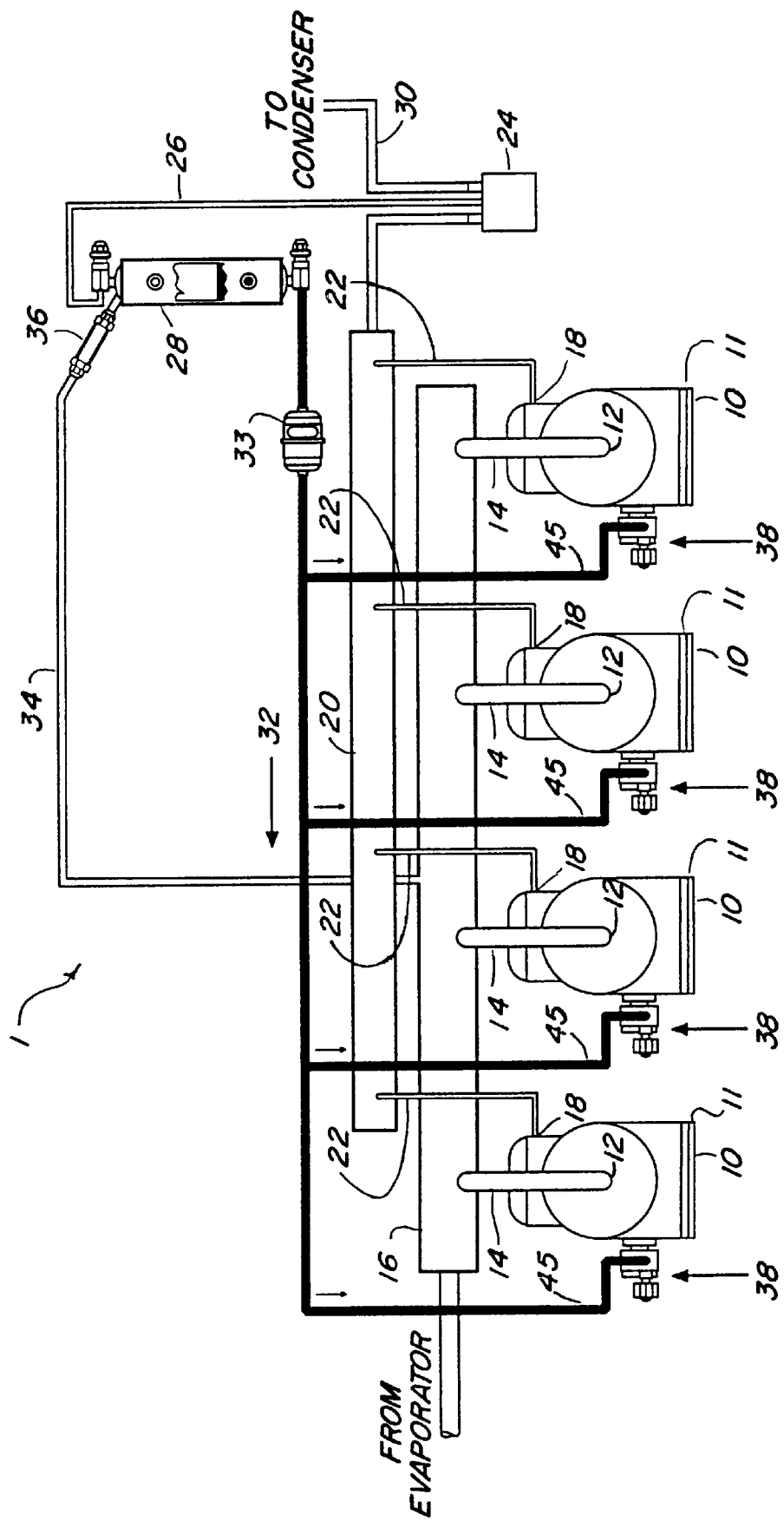
FIG. 1 is a diagrammatic representation of a refrigeration system utilizing the oil level control unit.

Referring now by reference numerals to the drawings and first to FIG. 1, it will be understood that a conventional refrigeration system 1 is shown having multi-compressor parallel systems, four in number in the embodiment shown. Each of the compressors 10 has a sump 11 and an inlet 12 connected by conduit 14 to a common suction header 16 which receives refrigerant vapor from the refrigeration evaporators. The refrigeration vapor is compressed by the compressors 10 and forced out of the compressor outlets 18 each of which is connected to a common discharge header 20 by conduits 22.

The discharge header 20 carries compressed refrigerant to an oil separator 24 which separates out any oil in the refrigerant. The oil separator 24 includes a float (not shown), which opens a valve when buoyed by the oil separated from the refrigerant contained therein. When the valve is opened the oil passes by conduit 26 to the oil reservoir 28. Refrigerant in the oil separator 24, containing a much reduced amount of oil, passes by conduit 30 to the condensers of the refrigeration system 1.

The oil reservoir 28 communicates by way of conduit 32 and conduits 45 with the compressors 10, said conduit 32, constituting an oil supply header, including an oil filter 33, which removes impurities in the oil. Oil reservoir 28 also communicates with common suction header 16 by way of conduit 34 which includes a differential check valve 36. The oil within the oil reservoir 28 contains dissolved refrigerant which boils out of the oil resulting in an increase of oil pressure within the oil reservoir 28. This pressure is maintained at a predetermined value, typically 15 psi above the oil pressure in the compressor sumps 11, by the differential check valve 36. When the vapor pressure within the oil reservoir exceeds 15 psi above the sump oil pressure, it is vented to the common suction header 16 and returned to the compressors 10. Importantly, an oil level control device 38 communicates between the sump 11 of each the compressors 10 and the oil reservoir 28, which constitutes an oil supply.

Figure 1A:
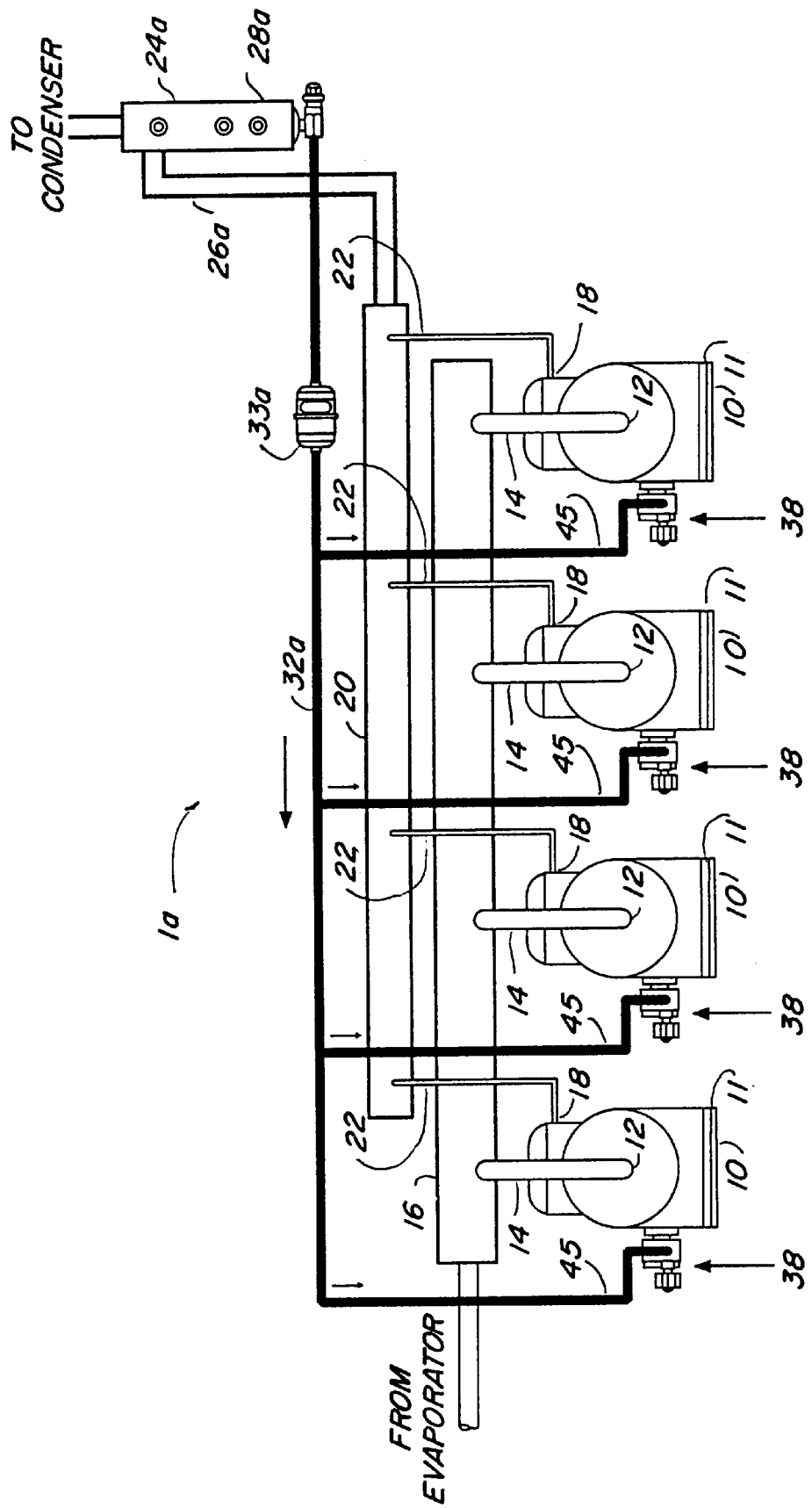
FIG. 1A is a similar representation of a modified refrigeration system utilizing the oil level control unit.
Figure 2:
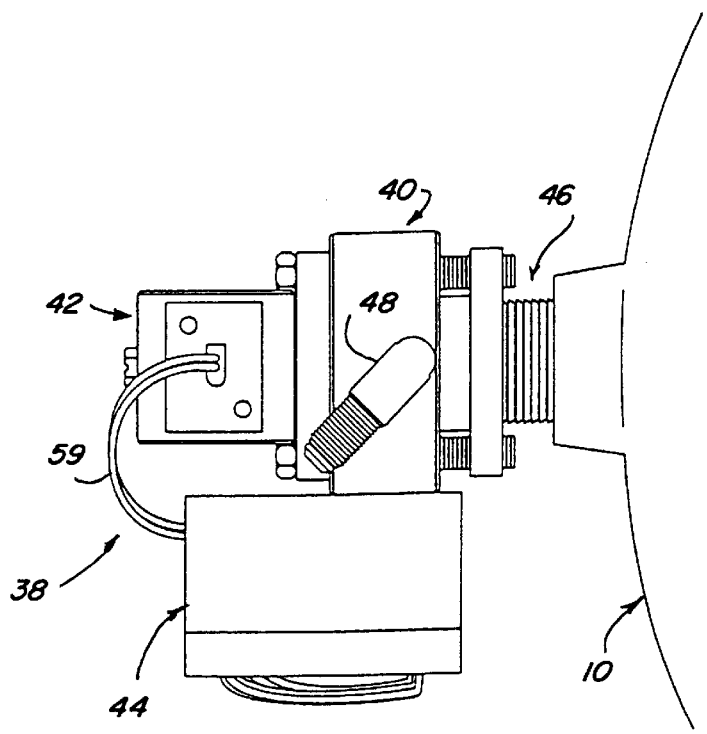
FIG. 2 is a plan view of the oil level control unit.

A modified refrigeration system 1a is shown in FIG. 1A. This system is generally similar to the multi-compressor parallel refrigeration system shown in FIG. 1 except that it utilizes a combination oil reservoir and separator. Accordingly, the same numerals are used to indicate the same components, a suffix "a" being used where the components are different. In the system shown in FIG. 1A, the oil reservoir 28a is located in the lower portion of the oil separator 24a and is pressurized with high side or discharge pressure. The supply line conduit 32a extending from the separator 24a connects directly to the oil level control 38 by way of the oil filter 33a.

In the embodiment of the system shown in FIG. 1, the oil level control devices 38 are used when it is desired only to add oil to the compressor sump 11. The structural arrangement of parts of the control device 38 will be described by reference to FIGS. 1–6.

Each oil level control device 38 includes a housing block 40, a solenoid 42 and a control box 44. As shown in FIG. 1, the housing block is connected to the sump 11 of an associated compressor 10, and to the common oil supply header 32 by a conduit 45 and an inlet 48.

Figure 5:
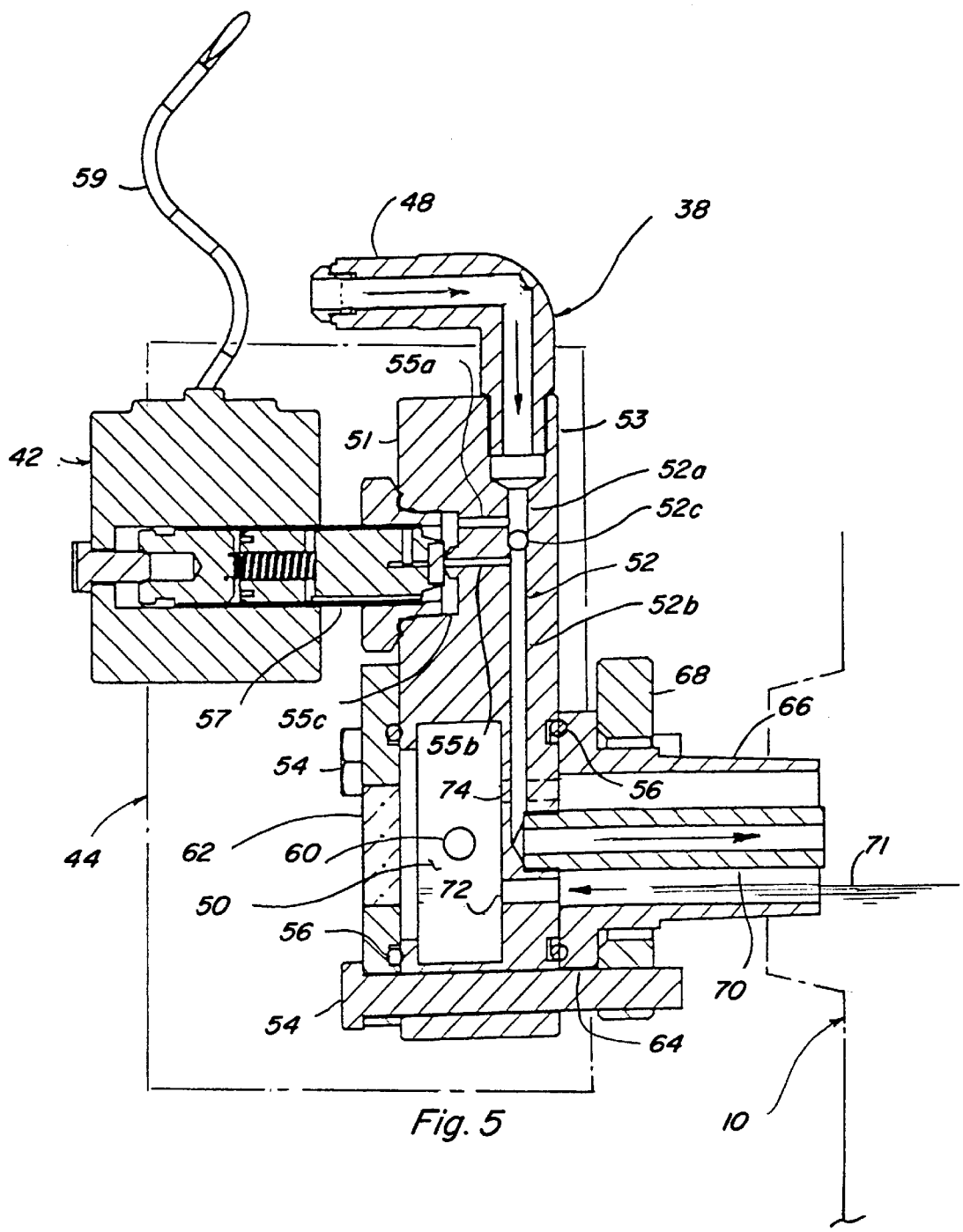
FIG. 5 is an elevational view of the oil level control unit taken on Line 5—5 of FIG. 4.

The housing block 40, defined in part by vertical walls 51 and 53, as best shown in FIG. 5, includes a sensing chamber 50 communicating with the compressor sump 11 through sump oil level openings 72, 74. The oil supply inlet 48 communicates with interior conduit means, having upper and lower portions 52a and 52b, which are separated by a ball stop 52c, and which is controlled by the solenoid valve 42 having electrical lines 59 connected to the control box 44. As shown, conduit 52a is connected to transverse conduit 55a and to transverse conduit 55b by way of a chamber 55c, controlled by a solenoid plunger 57. The sensing chamber 50 houses a horizontal insulated metallic probe 60, the chamber and the probe constituting a sensing means which is connected to the control box 44, the probe being visible through a sight glass 62.

Figure 3:
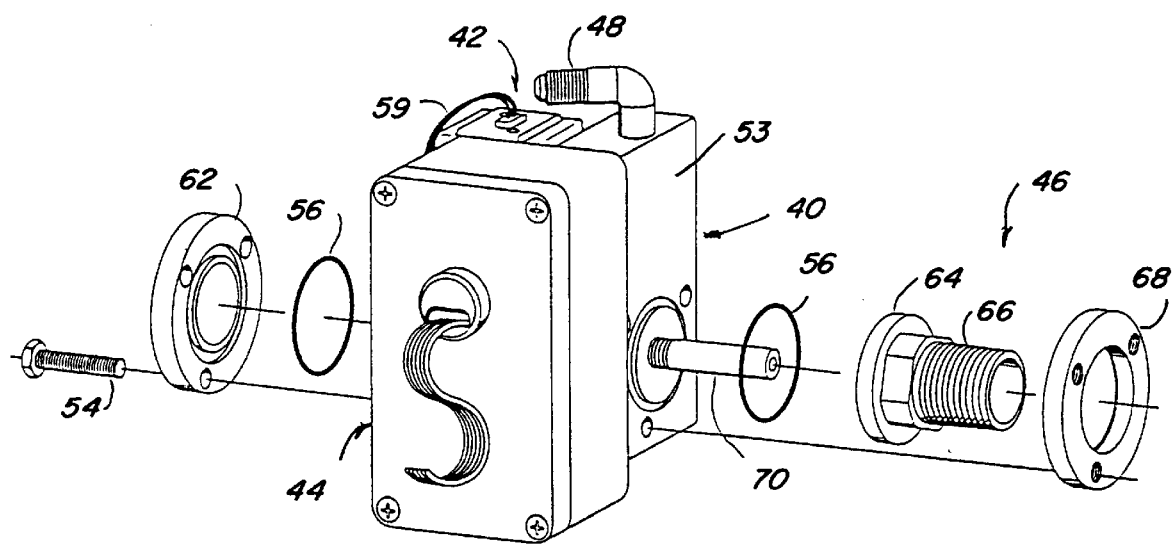
FIG. 3 is an exploded perspective view of the oil level control unit.
Figure 4:
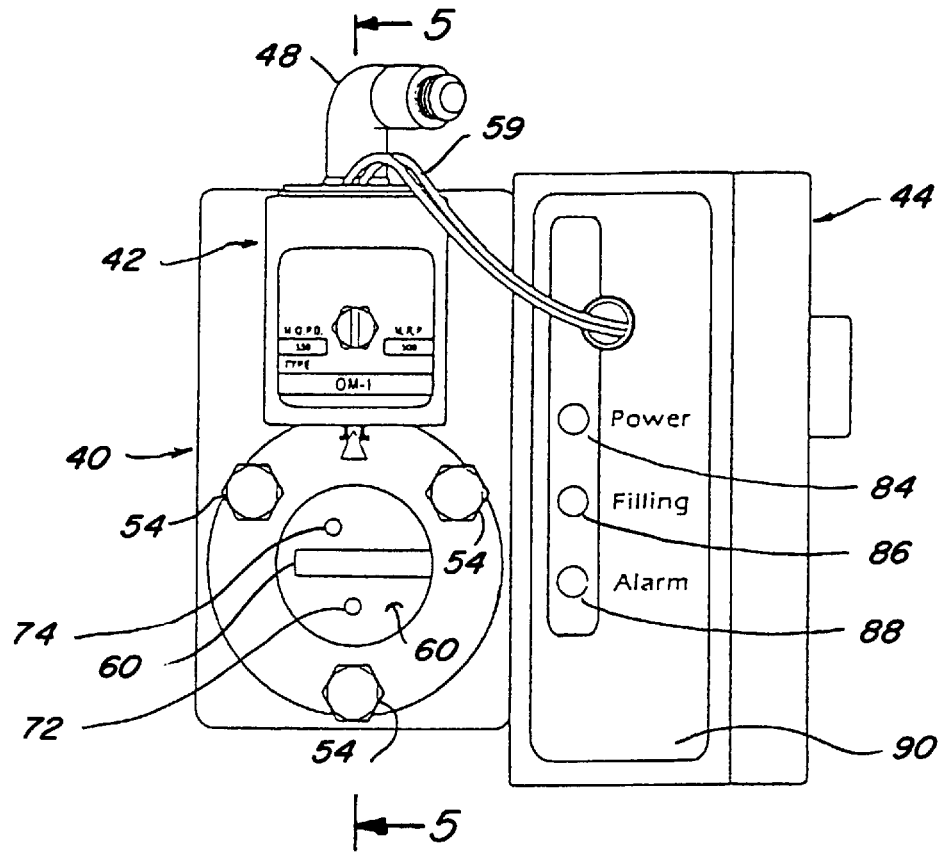
FIG. 4 is a front elevational view of the oil level control unit.
Figure 6:
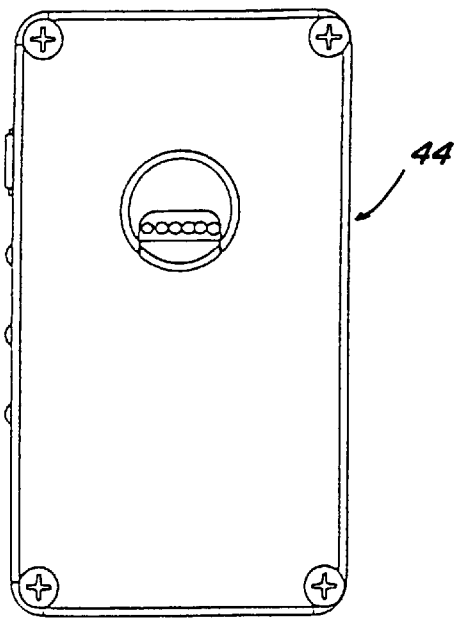
FIG. 6 is an elevational view of the unit taken on Line 6—6 of FIG. 4.

The frame of the sight glass 62 is attached to the front wall 51 of the housing block 40 by bolts 54, said sight glass frame being grooved to receive an O-ring 56. The attachment assembly 46, by which the housing block 40 is connected to the compressor 10 includes, as best shown in FIGS. 3 and 5, an adaptor 66 having flanged end 64 attached to housing wall 53 by a connector ring 68 having threaded openings receiving the sight glass bolts 54. The wall 53 is grooved to receive an O-ring 56. Threaded into the wall 53 is an interior conduit 70, which communicates with the inlet connection 48 through solenoid 42 at one end, and with the compressor sump 11 at the other end. Oil feed interior conduit 52, injection conduit 70 and solenoid 42 are isolated from, or by-pass, sensing chamber 50.

As the oil level shown by numeral 71 rises and falls in the sensing chamber, the probe 60 reacts to a change in the merit factor Q of a resonant circuit and generates a signal that opens and closes the solenoid valve 42 to maintain the correct oil level in the sump.

The oil level control unit 38 includes a relay RL1 (FIG. 7) to interrupt the compressor electrical control circuit in the event that a low oil level condition occurs for an extended period of time. Time delays are used with all changes in conditions that effect the signal, to open and close the oil fill solenoid valve 42 and also the alarm signal. These delays prevent any short cycling of the control unit and the compressor and are included in the operating parameters that are shown in Table 1.

TABLE 1

| | 24 VAC | | POWER | FILL SOLENOID | ALARM | RELAY CONTACT | |
|---|---|---|---|---|---|---|---|
| COND. | POWER | OIL LEVEL | GREEN LED | YELLOW LED | RED LED | NO | NC |
| 1 | NO | ANY | OFF | OFF | OFF | O | C |
| 2 | YES | SATISFIED | ON | OFF | OFF | C | O |
| 3 | YES | BELOW ½ < 10 SEC | ON | OFF | OFF | C | O |
| 4 | YES | BELOW ½ > 10 SEC | ON | ON | OFF | C | O |
| 5 | YES | BELOW ½ > 120 SEC | ON | ON | ON | O | C |
| 6 | YES | RETURN TO ½ < 10 SEC | ON | ON | ON | O | C |
| 7 | YES | RETURN TO ½ > 10 SEC | ON | OFF | ON | O | C |
| 8 | YES | RETURN TO ½ > 20 SEC | ON | OFF | OFF | C | O |

The LED indicator lights 84 (power), 86 (filling) and 88 (alarm) referenced in TABLE 1 are on the front face 90 of the control box 44 and show the operating condition at any given time.

The statements used in conditions 3–8 above are referenced to the halfway level of the sight glass 62 which corresponds to the level of the axis of the horizontal probe 60. Thus, in condition 3 "below ½<10 secs." stands for "If oil level is below the axis of the sensor for less than 10 sec . . . " and so on.

The oil level control unit 38 utilizes the oil injection tube 70 to deliver the oil directly into the compressor oil sump 11 as shown in FIG. 5. This arrangement prevents false signals from being conveyed to the sensing chamber 50 and also allows oil to be added to the compressor 10 while it is in operation. In some compressors, the oil in the sump is agitated to such an extent that oil will not flow from the sensing unit of a ball float into the compressor sump while the sensing unit is in operation.

It is thought that the structural arrangement of parts of the oil level control device has been described in sufficient detail and the installation and operation of the device will now be briefly described.

Each oil control level device 38 is installed by removing the conventional sight glass, which is provided by the compressor manufacturer on the associated compressor 10, and threadedly attaching the adaptor 66 in place of said sight glass. Care must be taken at this time to ensure that the probe 60 is level.

When 24VAC is supplied, the green indicator light 84 (power) is on. When the oil level falls below the set point, the fill solenoid valve 42 energizes and opens, and the yellow indicator light 86 (filling) comes on indicating that compressor oil replenishment is in progress. When the set point is realized, the fill solenoid valve 42 will remain energized for approximately 10 additional seconds.

If the oil level is below the set point for a period of approximately 120 seconds, the internal relay RL1 will shift and the red indicator 88 (alarm) will come on. Then, depending on the circuitry, the compressor may be turned off and an alarm signal sent. The fill solenoid valve 42 remains energized at the time the relay is shifted. The control device will automatically reset and restart the compressor when the oil level returns to the set point.

A detailed description of the preferred embodiment of the circuitry and operation thereof is provided below with reference to FIGS. 7–9.

Figure 7:
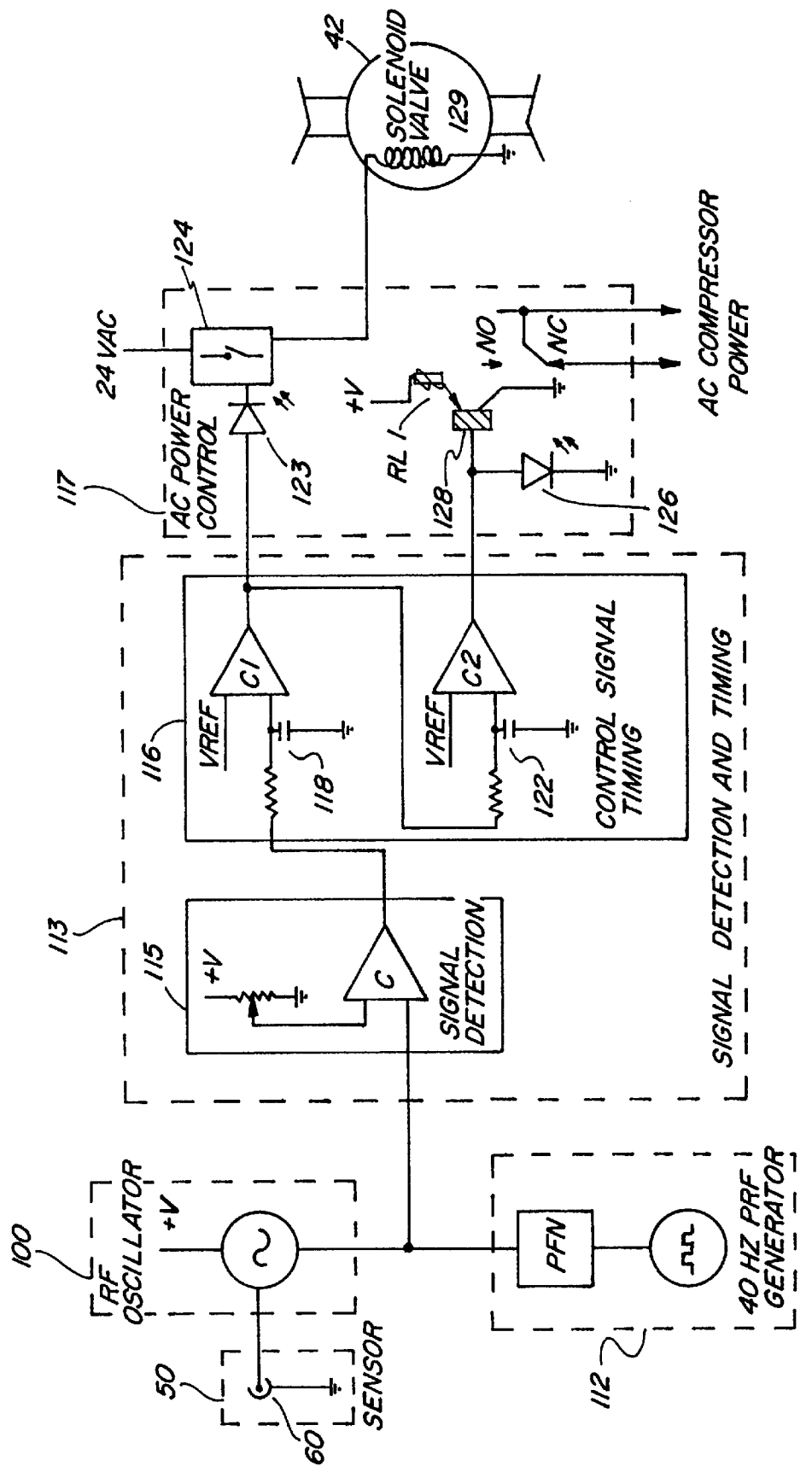
FIG. 7 is a block diagram of the sensor.

The principle of operation of the invention is shown summarily in the block diagram of FIG. 7, in which the system is seen to comprise of six elements, namely, an RF oscillator 100; a capacitative sensor consisting of the probe 60 and the sensing chamber 50; an RF oscillator gating circuit 112; an AC power control unit 117; the solenoid controlled oil valve 42; and a signal detection and timing unit 113. The RF oscillator 100 is of the Colpitts type and capable of circuit configurations producing signals in the range 300 MHz to 2 GHz. The RF oscillator operates at a frequency of typically 500 MHz and is switched on and off for a time duration of typically 100 $\mu$secs by means of a gating signal from a 40 Hz pulse repetition frequency (PRF) generator 112. The gated RF pulse train voltage is applied to a signal detection network 115 consisting of a comparator, detection threshold sensing adjustment network, and signal conditioning circuitry. The signal detection network 115 generates a low binary state 'logic 0' when the oil level falls below a predetermined level in the sensing chamber 50 and a high binary state 'logic 1' when the oil level is acceptably high. In the event of receiving a low binary state signal detecting input, the control signal timing element 116 issues an open valve command to the oil supply valve solenoid coil 129. After a time delay introduced by the RC network 118 and a threshold crossing event in comparator C1, the 'open valve' command illuminates a yellow LED 123, closing semiconductor switch 124, and permitting AC current to flow through the solenoid valve coil 129. A means is provided for a malfunction alert and system protection in the event that the oil level is not restored after a predetermined time, typically 120 seconds. The fault protection command 'close valve' signal is applied to RC network 122 and thence to one input of comparator C2. The network 122 introduces a delay of approximately 120 seconds after which, if the oil level has not been restored, the output of comparator C2 begins to rise, turning off transistor 128, and illuminating alarm diode LED 126. This in turn causes the coil of relay RL1 to become de-energized thus interrupting the AC current to the compressor.

Figure 8:
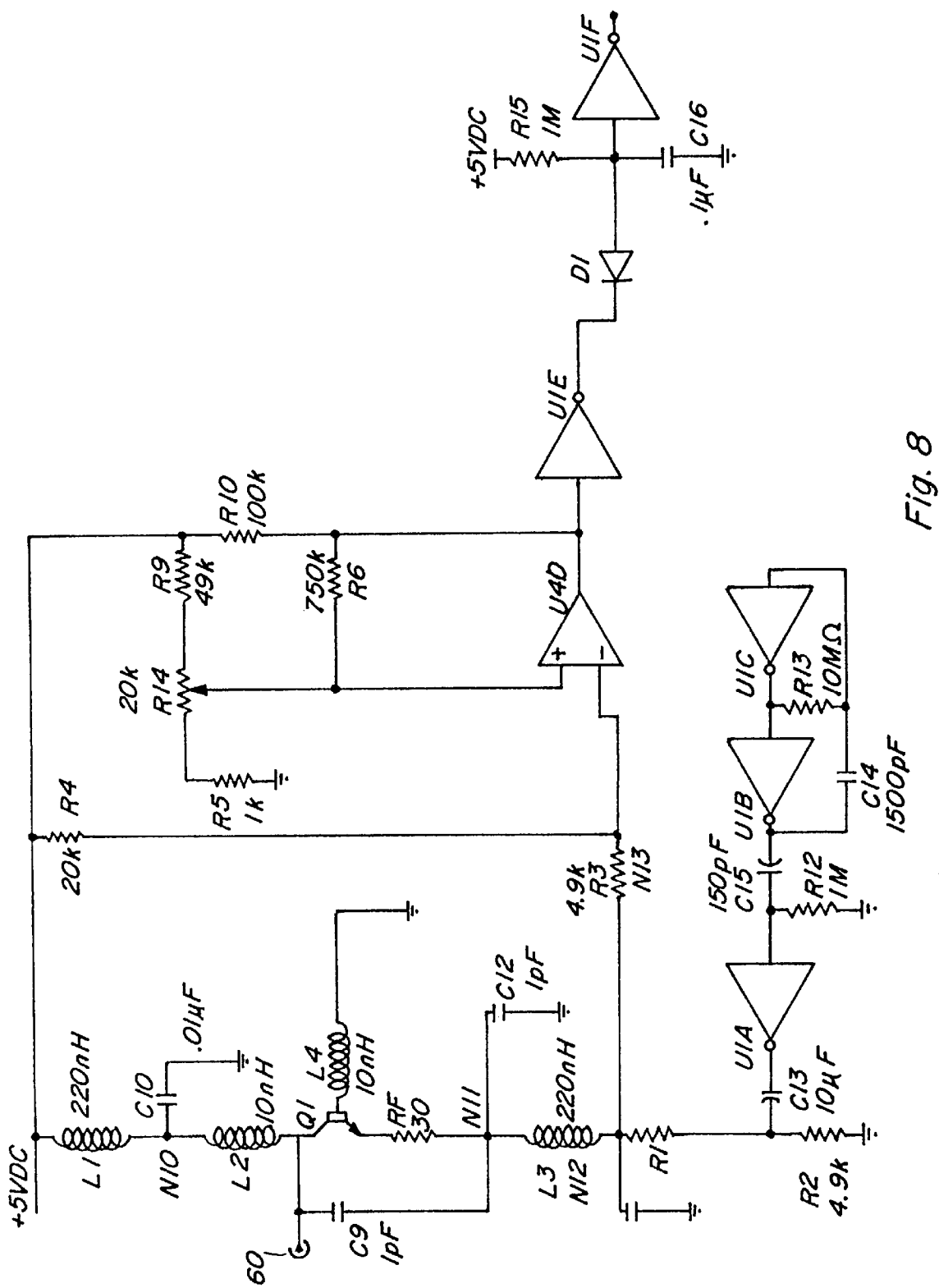
FIG. 8 is a diagram of one part of the circuitry.
Figure 9:
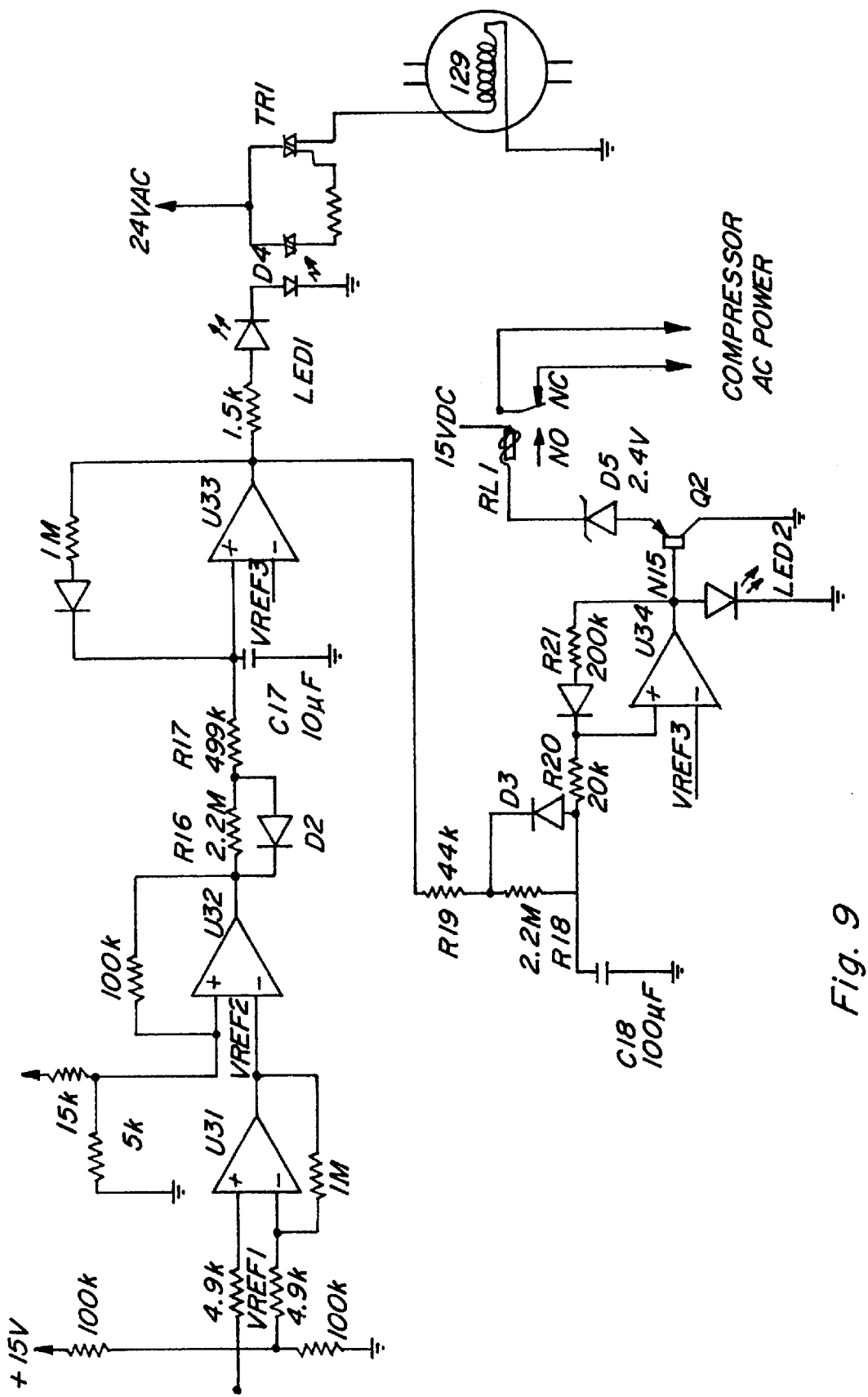
FIG. 9 is a diagram of another part of the circuitry.

FIG. 8 and FIG. 9 show a more detailed description of the probe 60 and the sensing chamber 50; pulse generator 112; signal detection 115; control signal timing 116; AC power switching 117; and signal detection and timing 113, shown in FIG. 7.

Referring to FIG. 8, a preferred embodiment of the oscillator, gating circuitry, signal detection, processing and control is shown in accordance with the principles of the invention. This type of oscillator circuit is generally described in U.S. Pat. No. 5,832,772 the contents of which is incorporated herein by reference for all purposes.

As also shown in FIG. 8, the system comprises of an RF oscillator based on transistor Q1, which has its base connected to ground through inductor L4. The collector of Q1 is connected through inductors L1 and L2 to a stabilized 5V DC supply. A capacitor C10 is connected from node N10 to ground. A resistor RF, capacitors C9, C12, connected at node N11 form a negative feedback network from the emitter to the collector circuits of transistor Q1. The network compensates for variations in the effects of open loop gain of transistor Q1 on its closed loop gain in the oscillator circuit, thereby stabilizing the frequency of oscillation. Capacitor C13 is driven by the output of invertor UIA. The input to invertor UIA is driven by a positive going pulsed voltage derived from a clock signal generator comprised of invertors UIB and UIC, resistors R12, R13, and capacitors C14, C15 at a repetition rate of typically 40 Hz. The clock signal generator turns the RF oscillator on and off at the pulse repetition frequency with an on period of typically 100 $\mu$sec.

Node N12 of the emitter circuit of Q1, is connected through resistor R3 to node N13 and thence to the inverting input of comparator U4D. Resistor R4 is also connected from a positive power supply to node N13 and establishes the desired DC condition at the inverting input to comparator U4D. The reference voltage input, typically 1.5 v, is determined by the resistive network R5, R9, R14. A vernier reference voltage adjustment is provided by potentiometer R14.

With a low oil level in the sensing chamber 50, FIG. 8, the RF oscillator pulsed output is high, and overrides the reference input voltage on the non-inverting input to comparator U4D. This forces the output of comparator U4D close to ground potential. Invertor UIE output is then driven towards +5V disconnecting diode D1, and allowing the "off" fraction of successive oscillator pulses to charge capacitor C16 through resistor R15 to +5V. Invertor UIF output eventually falls to 'logic 0', indicating a low oil condition in the sensing chamber. The 'logic 0' signal is accepted by the valve control circuitry and initiates replenishment as detailed with reference to FIG. 9. Referring again to FIG. 8, when the oil level is restored to the desired level, the RF oscillator output falls due to a reduction in the resonant circuit merit factor Q, and the voltage at node N13 falls below the level of the reference voltage at the non-inverting input to the comparator U4D. The output voltage of U4D rises towards +5V DC via R10, driving the output voltage of UIE towards ground potential. C16, previously charged by resistor R15, is now permitted to discharge through diode D1 to the near ground potential at the output of UIE. The charge and discharge time constant of capacitor C16 and R15 is relatively long compared with the input pulse repetition rate. Diode D1 therefore enables rapid discharge of capacitor C16 as positive going output pulses from comparator U4D cross the reference input voltage threshold of invertor UIE. Upon discharge of capacitor C16, the output of invertor UIF rises to 'logic 1', signaling a restored oil level condition in the sensing chamber 50.

FIG. 9 illustrates a representative schematic of a preferred method of processing the 'logic 0' and 'logic 1' conditions generated by the probe 60 and comparator functions detailed in FIG. 8. For an initial condition of 'logic 0', the output of invertor UIF, FIG. 8, is set close to ground potential, and applied to the non-inverting input of comparator U31. Input VREF1 then drives the output of U31 low, overriding the non-inverting input VREF2 at U32. The positive output of comparator U32 allows capacitor C17 to charge through resistors R16, R17. When the voltage at capacitor C17 overrides the positive voltage VREF3 at the inverting input of U33, the output at U33 rises positively causing the yellow light emitting diode LED1 to illuminate and activate optocoupler D4 and TRIAC switch TR1. Current from a 24AC supply enters the solenoid valve coil 129 through TRIAC TRI. Oil flow is initiated and continues until the required level is attained in the sensing chamber 50, FIG. 8. An oil flow fault monitoring path is provided by a circuit which utilizes comparator U34, PNP transistor Q2, and Relay RLI. The positive output voltage of comparator U33 is applied to capacitor C18 which charges with a time constant of typically 120 seconds determined by resistors R18 and R19. In the event of the output of U33 failing to return to ground within the time constant interval, reference voltage VREF3 at the inverting input to U34 overrides the non-inverting input, causing the output voltage of comparator U34 to rise. The rising output voltage of comparator U34 forward biases and turns on the alarm indicator LED2 and reverse biases the base emitter junction of transistor Q2, turning Q2 off, and de-energizing relay RL1. AC power to the compressor, supplied through the normally open contact NO of RL1 is thereby interrupted. A further measure of protection is assured by the same de-energizing sequence of relay RL1 occurring in the event a power failure in the oscillator circuit. Referring again to FIG. 8, when the oil level in the sensing chamber 50 is restored, the output of invertor UIF is driven to the high, or 'logic 1' condition, as previously described.

The 'logic 1' condition, applied to the non-inverting input of U31 forces U31 output high. The reference voltage input to comparator U32 is overriden, driving the output voltage low. With U32 output low, capacitor C17 discharges through resistor R17. Resistor R16 is bypassed by the now forward biased diode D2. With capacitor C17 discharged, the output of comparator U33 falls, deactivating optocoupler D4, de-energizing TRIAC TRI, interrupting the AC current in the solenoid valve coil, thereby interrupting further oil flow. When the 120 second default condition is satisfied by oil replenishment of the compressor sump and the sensing chamber 50, C18 is discharged through R19 and D3. The output of comparator U34 falls, de-energizing the fault indicator diode LED 2, allowing relay RL1 to energize, and compressor AC power to be restored. It will be understood that the signal detection FIG. 7, 115, control signal timing FIG. 7, 116, and AC power control FIG. 7, 117, heretofore described, permit a multiplicity of implementation means. Specifically, the functions detailed in control signal timing FIG. 7, 116, and FIG. 9 are amenable to implementation by coded logical and arithmetic instructions and data resident in a programmable microprocessor.

Thus, although the oil level control system has been described by making detailed reference to a preferred embodiment, such detail is to be understood in an instructive rather than in any restrictive sense, many variants being possible within the claims hereunto appended.

We claim as our invention:

1. An oil level control device for each compressor of a multiple compressor refrigeration system, said system including an oil supply, each control device being adapted to be attached between an associated compressor sump and the oil supply, each control device comprising:
   a) a housing, including an inlet communicating with the oil supply and an outlet communicating with an associated compressor sump;
   b) flow control means controlling flow from the oil supply into said compressor sump;
   c) a proximity detection system including a sensing chamber and a fixed, insulated metallic probe for detecting the presence of oil in the chamber and generating a signal that controls the supply of oil to said compressor sump to maintain the correct oil level in the sump; and
   d) control circuit means connected to the probe, said control circuit means having an output operating the flow control means.

2. A control device as defined in claim 1, in which:
   (e) the flow control means includes a solenoid valve attached to the housing for controlling flow between the housing inlet and the housing outlet.

3. A control device as defined in claim 1, in which:
   (e) the oil supply means includes an oil reservoir supplying oil to the compressor sump.

4. A control device as defined in claim 1, in which:
   (e) the sensing chamber communicates with the sump for receiving oil from the sump; and
   (f) the flow control means includes conduit means between the housing inlet and outlet, by-passing said sensing chambers said flow control means including a solenoid valve controlling flow through the conduit means and into the sump.

5. A control device as defined in claim 1, in which:
   (e) the sensing chamber includes lower and upper openings communicating between said chamber and the sump, the lower opening receiving fluid from the sump and the upper opening providing a relief opening permitting oil to rise in the chamber.

6. A control device as defined in claim 1, in which:
   (e) the control circuit means includes relay means which interrupts the circuit in the event that a low oil condition occurs for an extended period of time.

7. A control device as defined in claim 1, in which:
   (e) the control circuit means includes means protecting the compressors by disconnecting the power in the event that demand for oil replenishment is not fulfilled within a predetermined period.

8. An oil level control device for each compressor of a multiple compressor refrigeration system, said system including an oil supply, each control device being adapted to be attached between an associated compressor sump and the oil supply, each control device comprising:
   a) a housing, including an inlet communicating with the oil supply and an outlet communicating with an associated compressor sump;

b) flow control means controlling flow from the oil supply into said compressor sump;

c) a proximity detection system including a sensing chamber and a fixed, insulated metallic probe for detecting the presence of oil in the chamber and generating a signal that controls the supply of oil to said compressor sump to maintain the correct oil level in the sump; and d) control circuit means connected to the probe, said control circuit means having an output operating the flow control means.

(e) the proximity detection system comprising oscillator means for producing an output signal, the oscillator means comprising a transistor having a base, an emitter and a collector, the transistor having an open and a closed loop gain and a base-emitter junction that rectifies resonant signals at the collector to produce the output signal, the oscillator means further comprising negative feedback means for reducing the sensitivity of the closed loop gain to variations in the transistor's open loop gain and for stabilizing the frequency of the oscillator means;

(f) the probe being operatively coupled to the oscillator means for varying the level of the oscillator output signal in response to electrical properties of the oil; and (g) the control circuit means being operatively coupled to the oscillator means to receive the oscillator output signal and being responsive to variations of predetermined magnitudes of the amplitudes of the oscillator output signal for detecting the presence or level of the oil.

9. A control device as defined in claim 8, in which:

(h) the negative feedback means comprises a resistive element operatively coupled to the emitter for reducing the sensitivity of the closed loop gain to variations in the transistor's open loop gain.

10. A control device as defined in claim 9, in which:

(i) the negative feedback means further comprises a capacitive element operatively coupling the resistive element to the collector for stabilizing the frequency of the oscillator means.

11. A control device as defined in claim 8, in which:

(h) the probe in conjunction with the oscillator has a merit factor Q, the merit factor Q decreasing as the probe is placed in proximity to the oil and wherein the amplitude of the oscillations of the oscillator means will correspondingly diminish as the merit factor Q decreases, and wherein the oscillator output signal indicates the amplitude of the diminished oscillations.

12. A control device as defined in claim 8, in which:

(h) the control circuit means generates a plurality of predetermined control signals in response to the detection of the presence or level of the oil.

13. A control device as defined in claim 8, in which:

(h) the control circuit means further comprises comparator means for combining a reference signal and the oscillator output signal to form a difference signal which is representative of the difference between the reference signal and the oscillator output signal.

14. A control device as defined in claim 8, in which:

(h) the negative feedback means comprising a resistive element operatively coupled to the emitter and a capacitative element operatively coupling the resistive element to the collector; and (i) the control means generates a plurality of predetermined control signals in response to the detection of the presence or level of the oil.

\* \* \* \* \*